United States Patent
Prikhodko et al.

(10) Patent No.: US 12,443,195 B2
(45) Date of Patent: *Oct. 14, 2025

(54) TRUSTED MOTION UNIT

(71) Applicant: Analog Devices, Inc., Wilmington, MA (US)

(72) Inventors: Igor P. Prikhodko, Buzzards Bay, MA (US); Joseph Bergeron, Greensboro, NC (US); Alan Christopher O'Connor, Dedham, MA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/757,894

(22) Filed: Jun. 28, 2024

(65) Prior Publication Data
US 2024/0353844 A1   Oct. 24, 2024

Related U.S. Application Data

(63) Continuation of application No. 17/187,006, filed on Feb. 26, 2021, now Pat. No. 12,038,759.
(Continued)

(51) Int. Cl.
*G05D 1/00* (2024.01)
*G01C 21/16* (2006.01)
(Continued)

(52) U.S. Cl.
CPC .......... *G05D 1/027* (2013.01); *G01C 21/165* (2013.01); *G05D 1/0088* (2013.01);
(Continued)

(58) Field of Classification Search
CPC .... G05D 1/027; G05D 1/0088; G05D 1/0278; G05D 1/227; G05D 1/245; G05D 1/248; G01C 21/165; G01C 21/188; G01C 21/28
See application file for complete search history.

(56) References Cited

U.S. PATENT DOCUMENTS

| 5,504,482 A | 4/1996 | Schreder |
| 6,370,475 B1 | 4/2002 | Breed et al. |
| (Continued) | | |

FOREIGN PATENT DOCUMENTS

| CN | 201266089 Y | 7/2009 |
| CN | 208635810 U | 3/2019 |
| (Continued) | | |

OTHER PUBLICATIONS

Machine translation of WO2012172780 (Year: 2012).*
Randle et al., Low Cost Navigation Using Micro-Machined Technology. IEEE Xplore. Apr. 8, 2021; 1064-1067.

*Primary Examiner* — Anne Marie Antonucci
*Assistant Examiner* — Patrick Daniel Mohl
(74) *Attorney, Agent, or Firm* — ArentFox Schiff LLP

(57) ABSTRACT

Navigation systems and methods for autonomous vehicles are provided. The navigation system may include multiple navigation subsystems, including one having an inertial measurement unit (IMU). That unit may serve as the primary unit for navigation purposes, with other navigation subsystems being treated as secondary. The other navigation subsystems may include global positioning system (GPS) sensors, and perception sensors. In some embodiments, the navigation system may include a first filter for the IMU sensor and separate filters for the other navigation subsystems.

20 Claims, 9 Drawing Sheets

Related U.S. Application Data

(60) Provisional application No. 62/985,765, filed on Mar. 5, 2020.

(51) Int. Cl.
   *G05D 1/227* (2024.01)
   *G05D 1/245* (2024.01)
   *G05D 1/248* (2024.01)

(52) U.S. Cl.
   CPC .......... *G05D 1/0278* (2013.01); *G05D 1/227* (2024.01); *G05D 1/245* (2024.01); *G05D 1/248* (2024.01)

(56) References Cited

U.S. PATENT DOCUMENTS

| | | | |
|---|---|---|---|
| 6,408,245 B1* | 6/2002 | An | G01S 19/47 |
| | | | 701/472 |
| 6,421,622 B1 | 7/2002 | Horton et al. | |
| 12,038,759 B2* | 7/2024 | Prikhodko | G05D 1/0278 |
| 2001/0020216 A1 | 9/2001 | Lin | |
| 2010/0049439 A1* | 2/2010 | Cho | G01C 21/165 |
| | | | 701/472 |
| 2014/0104101 A1* | 4/2014 | Mizuochi | G01S 19/47 |
| | | | 342/357.3 |
| 2014/0214317 A1* | 7/2014 | Sanjay | G01C 21/165 |
| | | | 701/469 |
| 2016/0223683 A1* | 8/2016 | Boyarski | G01S 19/03 |
| 2017/0212248 A1 | 7/2017 | Bobye | |
| 2017/0357009 A1 | 12/2017 | Raab et al. | |
| 2018/0095476 A1 | 4/2018 | Madsen et al. | |
| 2018/0099718 A1 | 4/2018 | Bleecker et al. | |
| 2020/0124421 A1* | 4/2020 | Kang | G01S 17/06 |
| 2020/0158862 A1* | 5/2020 | Mahmoud | G01S 13/931 |
| 2021/0072029 A1* | 3/2021 | Marques | G01C 21/206 |
| 2021/0116579 A1* | 4/2021 | Rezaei | G01S 19/25 |
| 2021/0278847 A1 | 9/2021 | Prikhodko et al. | |
| 2022/0171077 A1* | 6/2022 | Kassas | G01S 19/49 |

FOREIGN PATENT DOCUMENTS

| | | | | |
|---|---|---|---|---|
| CN | 110095793 A | | 8/2019 | |
| CN | 110455275 A | | 11/2019 | |
| CN | 110849362 A | | 2/2020 | |
| TW | I674984 B | | 10/2019 | |
| WO | WO-2012172780 A1 * | 12/2012 | ............ G01S 19/26 |

* cited by examiner

TRUSTED MOTION UNIT

CROSS-REFERENCE TO RELATED APPLICATIONS

This application is a continuation claiming the benefit of U.S. application Ser. No. 17/187,006, filed Feb. 26, 2021, and entitled "TRUSTED MOTION UNIT," which is hereby incorporated herein by reference in its entirety.

U.S. application Ser. No. 17/187,006 claims the benefit under 35 U.S.C. § 119 (e) of U.S. Provisional Patent Application Ser. No. 62/985,765, filed Mar. 5, 2020, and entitled "TRUSTED MOTION UNIT," which is hereby incorporated by reference herein in its entirety.

FIELD OF THE DISCLOSURE

The present application relates to navigation systems and methods for vehicles.

BACKGROUND

Autonomous vehicle navigation systems sometimes include multiple sensor types. Lidar, radar, camera, global positioning systems (GPS), inertial measurement unit (IMU), and wheel speed sensors are sometimes used as part of a navigation system for autonomous vehicles. Typically, the navigation systems treat the GPS sensor as the primary sensor, with its data being refined by the sensors which provide local information, such as IMU data, or data from lidar, radar, or camera systems.

BRIEF SUMMARY

Navigation systems and methods for autonomous vehicles are provided. The navigation system may include multiple navigation subsystems, including one having an inertial measurement unit (IMU). That unit may serve as the primary unit for navigation purposes, with other navigation subsystems being treated as secondary. The other navigation subsystems may include global positioning system (GPS) sensors, and perception sensors. In some embodiments, the navigation system may include a first filter for the IMU subsystem and separate filters for the other navigation subsystems. The IMU may operate at lower latency than the other sensors of the navigation system in at least some embodiments.

According to some embodiments, a trusted motion unit for an autonomous vehicle is provided, comprising an inertial measurement unit (IMU), an integration circuit configured to receive an output signal of the inertial measurement unit, and a first filter configured to receive an output signal of the integration circuit and an output signal from a second filter.

According to some embodiments, a navigation system for an autonomous vehicle is provided, comprising: a plurality of navigation subsystems including a first navigation subsystem comprising an inertial measurement unit (IMU) and a first filter, and a second navigation subsystem comprising a second filter, wherein the first filter is coupled to the second filter, configured to receive an input signal from the second filter, and configured to provide a feedback signal to the IMU.

According to some embodiments, a navigation system for an autonomous vehicle is provided, comprising: a first navigation subsystem comprising an inertial measurement unit (IMU), and a first filter coupled to the IMU in a feedback loop. The navigation system further comprises a second navigation subsystem comprising a sensor, and a second filter coupled to receive an output signal of the sensor and coupled to an input terminal of the first filter.

According to some embodiments, a method of localization is provided for an autonomous vehicle having a first navigation subsystem including an inertial measurement unit and a first filter and a second navigation subsystem including a sensor and a second filter. The method comprises applying an output signal of the IMU to the first filter, applying an output signal of the sensor to the second filter, and applying an output signal of the second filter to the first filter.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
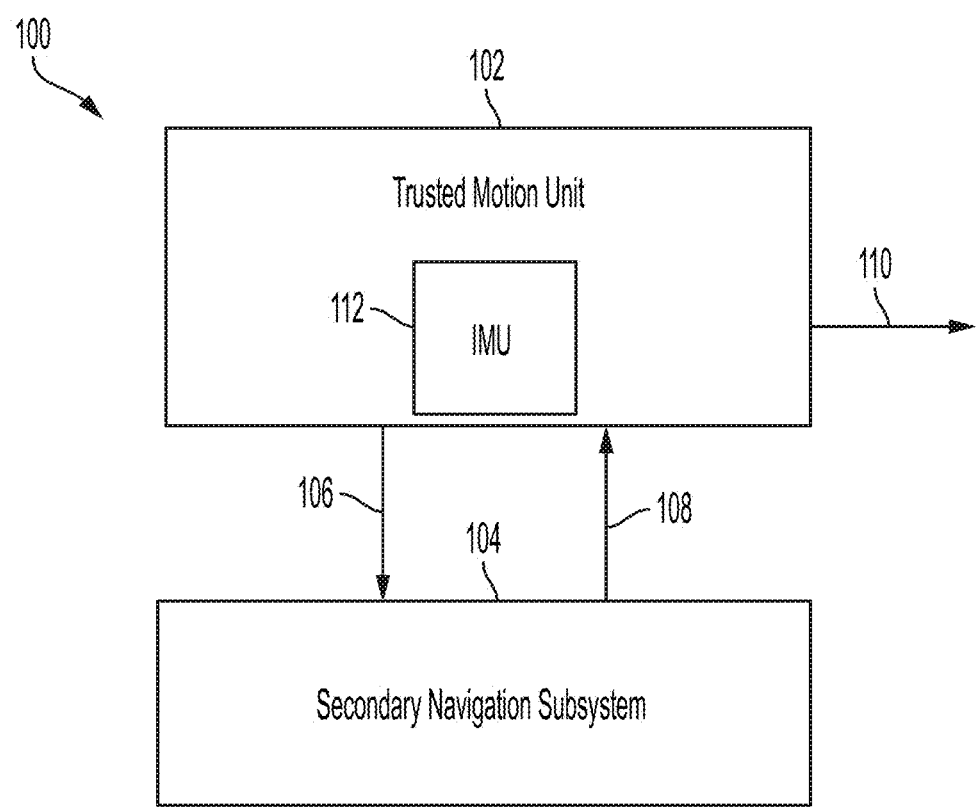
FIG. 1 is a block diagram of a navigation system according to a non-limiting embodiment of the present application, in which an inertial measurement unit serves as the primary navigation sensor.

According to an aspect of the present application, a system and method are provided for vehicle localization, in which data from multiple kinds of sensors are used in combination, with an inertial measurement unit (IMU) being treated as the primary sensor and data from that unit being treated as trusted data to be corrected by data from the other sensors. Localization refers to knowing the location of the vehicle. The different types of sensors may be used to provide the pose of the vehicle in a local reference frame and, in some embodiments, in a global reference frame. Providing pose in a local reference frame may mean providing position in, for example, meters in an X, Y, Z frame with respect to a local position, such as a city. Local position may be reported in terms of North, East, and Up coordinates. Providing position in a global reference frame may mean that position may be reported in terms of latitude and longitude on Earth's sphere. The IMU may provide data indicative of the pose of the vehicle in the local reference frame. That data may be informed by data from a perception navigation subsystem and/or a global positioning navigation subsystem. Aspects of the present application provide enhanced localization, in which the location of the vehicle may be determined within an accuracy of 10 cm and/or with a latency of 10 milliseconds or less. Such precise localization may be beneficial in autonomous vehicles, where precise knowledge of vehicle location can have a significant impact on safety.

According to an aspect of the present application, an autonomous vehicle localization system combines data from an IMU, one or more perception sensors, and GPS, with the IMU being treated as the primary sensor. The IMU may be a 6 degree-of-freedom (6 DOF) IMU. The perception sensors may include lidar, radar, a camera, an ultrasonic sensor, a wheel odometry sensor, steering direction (or heading intent) sensor, and steering wheel rotation sensor (or steering actuator input). In contrast to an approach in which the GPS sensor or the perception sensors are treated as the primary sensor, with the IMU providing correction, aspects of the present application provide enhanced localization by treating the IMU as the primary sensor, aided by correction from the perception sensor(s) and/or GPS. The inventors have appreciated that determining localization from a global level to a local level, such as by relying on GPS as the primary sensor, aided by perception systems and an IMU, is problematic and inconsistent with the reality of how human operators operate a vehicle to make decisions about steering, braking, or taking other actions. Instead, assessing location primarily from local detectors, and then correcting based on global indicators of location provides greater accuracy. Also, because IMUs are immune to external influences, such as weather conditions or jamming, their use as the primary sensor provides a high degree of accuracy compared to a system which uses a GPS or perception sensors as the primary navigation system sensor, since those other types of sensors are susceptible to data outages and/or environmentally caused outages. The IMU-based navigation subsystem may provide latitude, longitude, pitch, and roll in all environmental conditions. This approach of making the environmentally insusceptible IMU the primary sensor means that a vehicle can travel much farther safely (e.g., a few seconds) than if the perception or GPS sensors were the primary sensor. Further still, IMUs may exhibit lower latency than perception sensors, other local sensors, and/or GPS technology, meaning that use of an IMU as the primary sensor may result in lower latency (faster) localization. In general, the IMU may operate with lower latency than the other sensors of the navigation system. The IMU may exhibit the lowest latency of any sensor of the navigation system.

According to an aspect of the present application, a so-called trusted motion unit (TMU) is provided. A trusted motion unit is a navigation system comprising an inertial measurement unit and configured to output localization information based on data from the IMU and from a navigation subsystem including a different sensor type, with the data from the IMU being treated as primary data to be corrected by data from the other sensor type. The trusted motion unit may include an integration circuit and an extended Kalman filter, which may be an Error State Kalman Filter. The integration circuit may receive and integrate an output signal from the IMU, and provide an output signal to the extended Kalman filter. The extended Kalman filter may also receive input signals from Kalman filters of other navigation subsystems of the autonomous vehicle. For example, the autonomous vehicle may comprise a perception navigation subsystem and/or a global positioning system (GPS) navigation subsystem, each of which may include its own Kalman filter. The extended Kalman filter of the trusted motion unit may receive output signals from both of the Kalman filters. The extended Kalman filter of the trusted motion unit may also provide a feedback signal to the IMU. Ultimately, the integration circuit of the trusted motion unit may output a signal indicative of localization of the autonomous vehicle.

FIG. 1 is a block diagram of a navigation system according to a non-limiting embodiment of the present application, in which an inertial measurement unit serves as the primary navigation sensor. The navigation system 100 comprises a trusted motion unit (TMU) 102 and secondary navigation subsystem 104. The trusted motion unit 102, which may be considered a navigation subsystem of the larger navigation system 100, comprises an IMU 112. The trusted motion unit 102 is coupled to the secondary navigation subsystem 104 to both provide an input signal 106 to the secondary navigation subsystem 104 and to receive an output signal 108 from the secondary navigation subsystem 104. The trusted motion unit 102 also provides an output signal 110 which may represent localization of the vehicle in or on which the navigation system 100 is disposed. For example, the output signal 110 may represent a pose of the vehicle in a local reference frame.

The IMU 112 may be any suitable IMU. In some embodiments, the IMU is a six degree-of-freedom ("6DOF") IMU. In such embodiments, the IMU may produce data representing yaw, pitch, roll, and velocity along the x, y, and z directions. Alternatives are possible, however, as not all embodiments of a TMU are limited to the IMU being a 6DOF IMU. For example, the IMU may provide data regarding motion along or around one or more axes.

The secondary navigation subsystem 104 may comprise a sensor of a type other than an IMU. For example, the secondary navigation subsystem 104 may comprise a perception sensor, such as a camera, lidar, radar, ultrasonic sensor, and/or wheel speed sensor. The secondary navigation subsystem 104 may comprise a global positioning system sensor. Examples of secondary navigation subsystems are described further below in connection with subsequent figures.

The trusted motion unit 102 may be treated as the primary navigation subsystem of the navigation system 100. In some embodiments, the navigation systems described herein may be said to perform sensor fusion. Data from the primary navigation subsystem is fused with data from secondary navigation subsystems. The IMU 102 may have lower latency than the sensor(s) of the secondary navigation subsystem 104. For example, the IMU may provide inertial data with a latency of several milliseconds or less. In some embodiments, the IMU may provide inertial data with a latency of less than 1 ms. By contrast, the secondary navigation subsystem may provide localization data with a latency between 10 ms and more than 100 ms. For instance, a GPS system may exhibit latency on the order of 100 ms, a perception system may exhibit latency on the order of 50 ms, and a controller area network (CAN) sensor may exhibit latency of 10 msec or more. Thus, using the IMU as the primary sensor may provide an overall system with lower latency than would be achieved by using one of the other subsystems as the primary system. The lower latency may translate to greater precision in localization. For example, navigation systems as described herein may be accurate to within 10 cm or less. In at least some embodiments, the IMU may exhibit the lowest latency of any sensor of the navigation system. Also, IMUs are not susceptible to environmental conditions, such as satellite outages, or various weather conditions. While the IMU 102 may be susceptible to growing errors over time, the data from the secondary navigation subsystem may serve to update or correct the IMU data. In this manner, highly precise localization data can be provided by the navigation system 100 irrespective of satellite accessibility or weather conditions. The trusted motion unit may be treated as the root of trust of the navigation system 100.

Figure 2A:
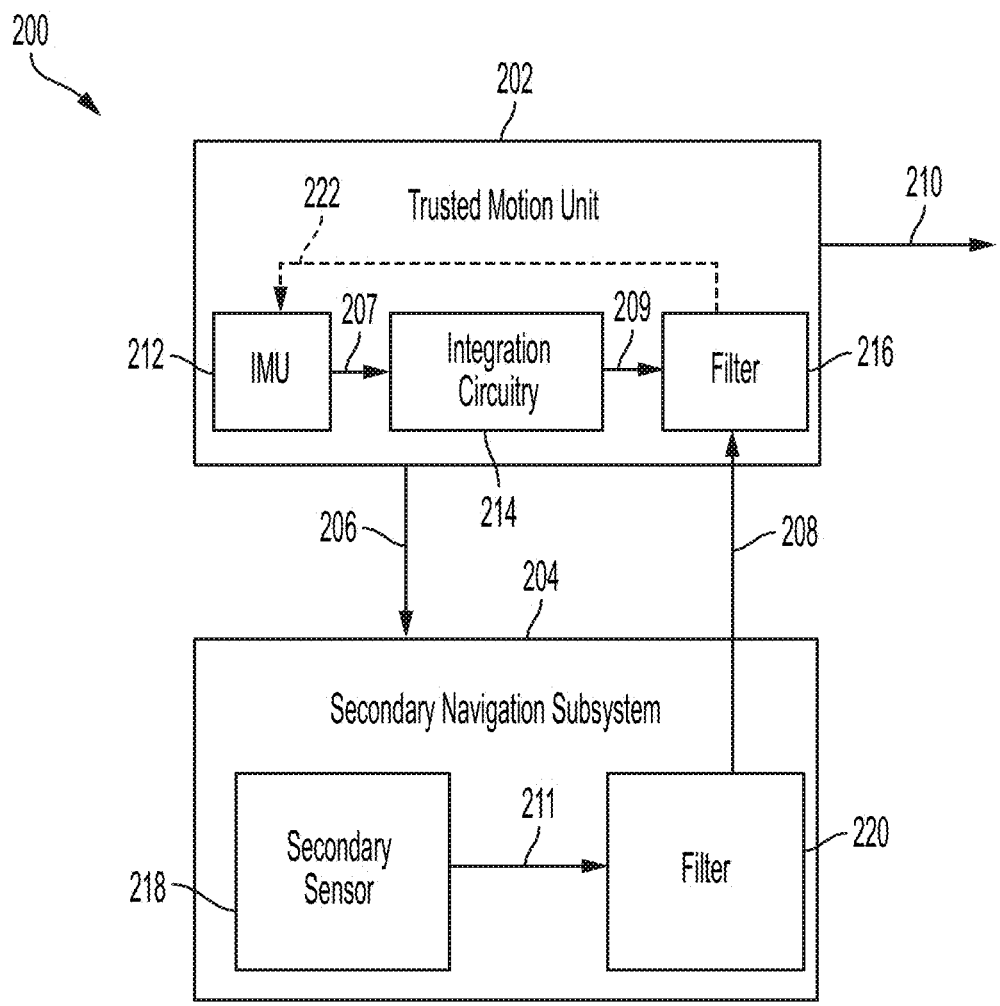
FIG. 2A is a non-limiting example of a more detailed implementation of the navigation system of FIG. 1.

FIG. 2A is a non-limiting example of a more detailed implementation of the navigation system of FIG. 1. FIG. 2A illustrates a navigation system 200. The trusted motion unit (TMU) 202 represents an example implementation of the trusted motion unit 102. The secondary navigation subsystem 204 represents an example implementation of the secondary navigation subsystem 104.

As shown, the trusted motion unit 202 comprises IMU 212, integration circuitry 214, and filter 216. Optionally, a feedback path 222 is provided from the filter 216 to the IMU 212, to provide a feedback signal. The IMU 212 may be any suitable IMU, such as the types described above in connection with IMU 112. The integration circuitry 214 may be a suitable circuit for integrating data provided by the IMU 212. In some embodiments, the IMU 212 and integration circuitry 214 may be formed within the same package, and in some embodiments are formed on the same semiconductor die. The filter 216, which is described in more detail below, may be an extended Kalman filter (EKF), a Bayesian filter, or a particle filter. In some embodiments, the filter 216 is an Error State Kalman Filter. In some embodiments, such as that shown in FIG. 2B, described below, the filter 216 may be omitted.

The secondary navigation subsystem 204 includes a secondary sensor 218 and filter 220. The secondary sensor 218 may be a GPS sensor, or a perception sensor. Examples of perception sensors include cameras, lidar, radar, ultrasonic sensors, wheel speed sensors, wheel odometry sensors, steering direction (or heading intent) sensors and steering wheel rotation (or steering actuator input) sensors. Wheel odometry may be sensed by some combination of wheel speed and steering data. Wheel speed sensors, wheel odometry sensors, steering direction sensors and steering wheel rotation sensors may communicate over a controller area network (CAN) bus, and thus may be considered non-limiting examples of "CAN sensors." The secondary sensor 218 is secondary in that its data may be used to refine the data provided by the trusted motion unit 202, with the data from the trusted motion unit 202 being treated as the trusted data output by the navigation system 200. The secondary navigation subsystem 204 may include multiple secondary sensors 218. For example, the secondary navigation subsystem 204 may be a perception navigation subsystem, comprising two or more of a camera, lidar, radar, ultrasonic sensor, wheel odometry sensor, steering direction (or heading intent) sensor and steering wheel rotation (or steering actuator input) sensor. The output signals of those may all be provided to the filter 220, in at least some embodiments.

In operation, the trusted motion unit 202 and the secondary navigation subsystem 204 both generate data that is exchanged. The IMU 212 may generate motion data that is provided as signal 207 to the integration circuitry 214. The integration circuitry 214 integrates the motion data and provides an integrated signal 209 to the filter 216.

The trusted motion unit 202 also provides an input signal 206 to the secondary navigation subsystem 204. That input signal 206 may represent the motion data that is also provided to the integration circuitry 214 and thus may be provided directly from the IMU 212, or may be other data generated by the IMU 212. That data may be suitably combined with the data generated by the secondary sensor 218 and input to the filter 220 as signal 211. The filter 220 may process the signal 211 to generate local positioning information. That local positioning information may be provided as an output signal 208 of the secondary navigation subsystem 204 to the filter 216 of the trusted motion unit. The filter 216 may process the output signal 208 in combination with the integrated signal 209 and output a feedback signal on the feedback path back 222 to the IMU 212. That feedback signal may be used by the IMU to correct its motion data. The trusted motion unit 202 outputs a signal 210 indicative of the pose of the vehicle in a local reference frame. In at least some embodiments, the signal 210 may be output by the integration circuitry 214, although alternatives are possible.

As described above, the navigation system 200 includes two filters, filter 216 and 220, with the output of one filter (filter 220) being input to the other filter (filter 216). This configuration may be described as staged filters. Also, as described, the filter 220 may be a Kalman filter (e.g., an Error State Kalman Filter), and the filter 216 may be an extended Kalman filter. The use of separate filters for separate subnavigation systems may provide various benefits. For example, the use of separate filters allows them to be weighted differently. Controlling the weights of the filters may allow for weighting the filter as part of the trusted motion unit more heavily than the filters for the secondary navigation subsystems, which is done in at least some embodiments. As one example, a perception navigation subsystem may experience noise, as a result of which the navigation system may weight more heavily data from the IMU. Moreover, the use of separate filters provides reduced processing latency and power consumption compared to using a single filter.

Figure 2B:
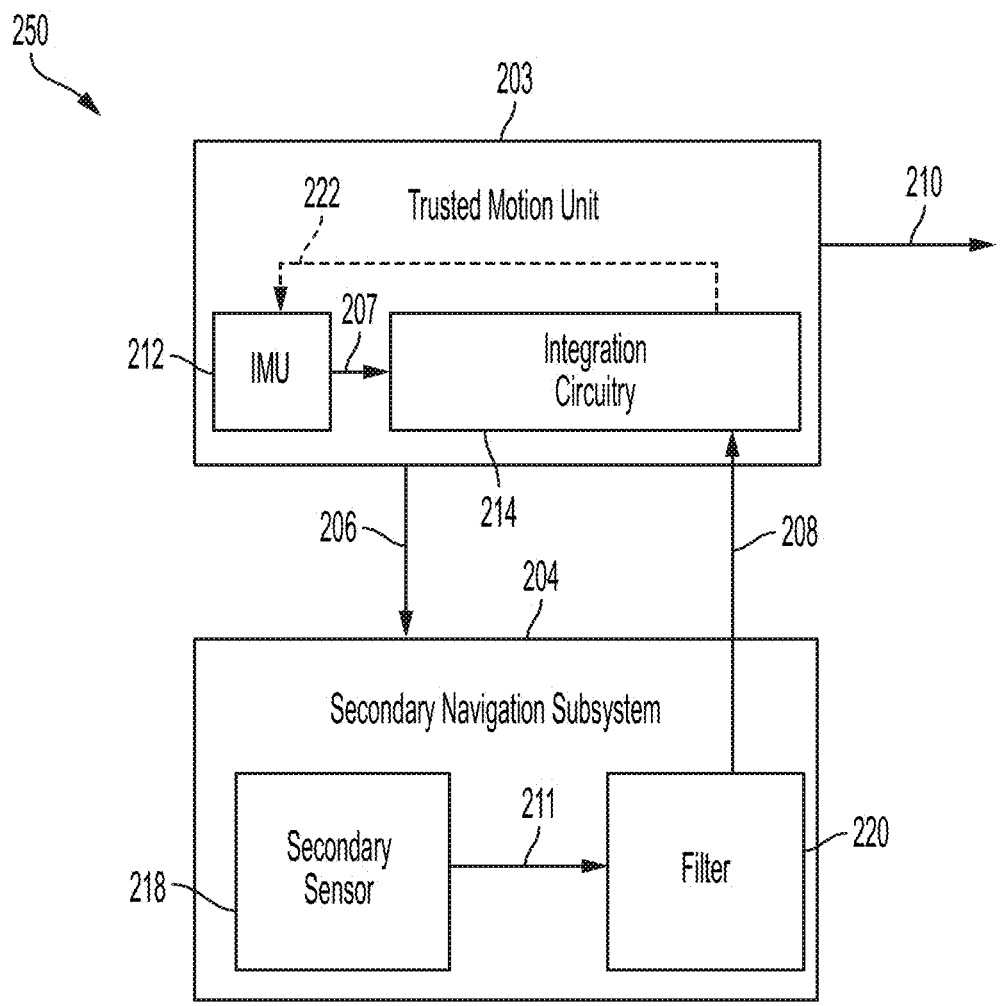
FIG. 2B is an alternative to FIG. 2A, illustrating another non-limiting example of a more detailed implementation of the navigation system of FIG. 1.

FIG. 2B shows an alternative non-limiting example of a more detailed implementation of the navigation system of FIG. 1. The navigation system 250 of FIG. 2B is the same as the navigation system 200 of FIG. 2A, except that the trusted motion unit 203 differs from the trusted motion unit 202 in that the filter 216 is omitted and the output signal 208 of filter 220 is provided to the integration circuitry 214. The feedback path 222 goes from the integration circuitry 214 to the IMU 212. The configuration of FIG. 2B is simpler than that of FIG. 2A.

Figure 3A:
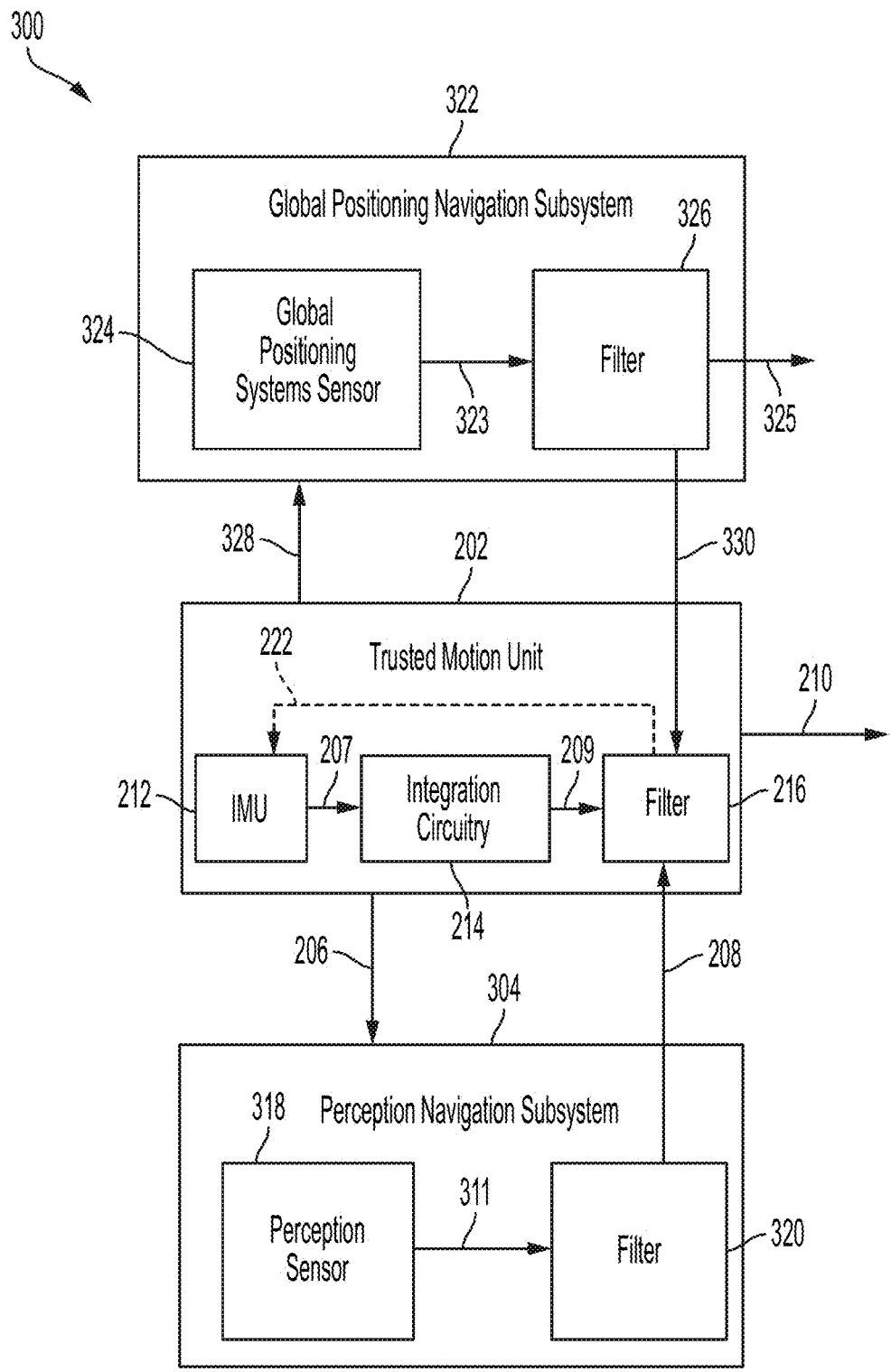
FIG. 3A is a non-limiting example of a further detailed implementation of the navigation system of FIG. 1, comprising a global positioning navigation subsystem and perception navigation subsystem.

FIG. 3A is a non-limiting example of a further detailed implementation of the navigation system of FIG. 1, comprising a global positioning navigation subsystem and perception navigation subsystem. The navigation system 300 comprises trusted motion unit 202, perception navigation subsystem 304 and global positioning navigation subsystem 322. The perception navigation subsystem 304 and global positioning navigation subsystem 322 may each represent an example implementation of the secondary navigation subsystem 204 of FIGS. 2A and 2B.

The trusted motion unit 202 has been described previously in connection with FIG. 2A, and thus is not described in detail here.

The perception navigation subsystem 304 comprises perception sensor(s) 318 and filter 320. The perception sensor 318 may be any of the types of perception sensors described previously herein. Perception sensor 318 may generate data that is combined with input signal 206 from the trusted motion unit 202 and input to the filter 320 as signal 311. The filter 320 may process the signal 311 to generate local positioning information. That local positioning information may be provided as the output signal 208 of the perception navigation subsystem 304 to the filter 216 of the trusted motion unit, or alternatively directly to the integration circuitry 214.

Global positioning navigation subsystem 322 comprises a global positioning system (GPS) sensor 324 and filter 326. The GPS sensor 324 generates GPS data, which is provided to the filter 326 as signal 323. The filter 326 may be a Kalman filter, that outputs a signal 325 representing a pose of the vehicle in a global reference frame.

In operation, the trusted motion unit 202 interacts with the perception navigation subsystem 304 and global positioning navigation subsystem 322 in the manner previously described in connection with secondary subsystem 204 of FIGS. 2A and 2B. The trusted motion unit 202 provides the input signal 206 to the perception navigation subsystem 304. The perception navigation subsystem generates the output signal 208 using the filter 320. That output signal 208 is provided as one input to the filter 216 of the trusted motion unit, or alternatively may be provided directly to the integration circuitry 214. The trusted motion unit 202 also provides an input signal 328 to the global positioning navigation subsystem 322. The input signal 328 may be the same as the input signal 206 in some embodiments. In some embodiments, the input signal 328 is provided directly to the filter 326, and thus is an input signal to the filter 326. The filter 326 also provides an output signal 330 to the filter 216, or directly to the integration circuitry 214. Thus, in this non-limiting embodiment, the filter 216 receives an input signal from the integration circuitry 214, an output signal of the filter 320, and an output signal of the filter 326. The filter 216 optionally provides the previously-described feedback signal to the IMU on feedback path 222, with the feedback signal being the result of processing the input signals to the filter 216 from the IMU, the perception navigation subsystem 304 and the global positioning navigation subsystem 322. As with the navigation system 200 of FIG. 2A, the navigation system 300 includes staged filters, with the filters 320 and 326 providing input signals to the filter 216. The benefits of using multiple filters have been described previously herein in connection with FIGS. 2A and 2B, and may likewise apply to the non-limiting embodiment of FIG. 3A.

Figure 3B:
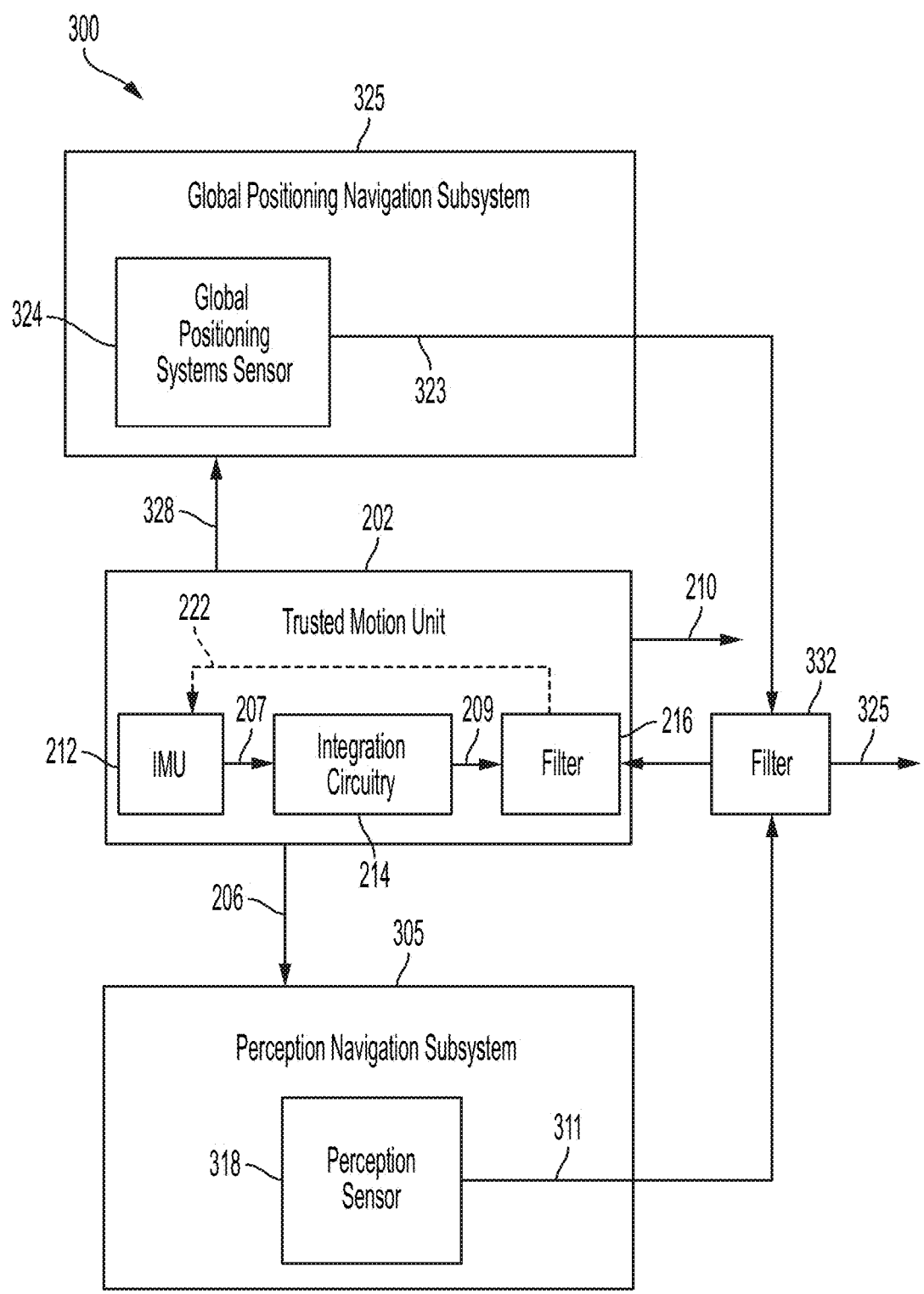
FIG. 3B is an alternative to FIG. 3A, illustrating another non-limiting example of a detailed implementation of the navigation system of FIG. 1.

FIG. 3B is an alternative to FIG. 3A, illustrating another non-limiting example of a detailed implementation of the navigation system of FIG. 1. The navigation system 350 of FIG. 3B differs from the navigation system 300 of FIG. 3A in that the filters 320 and 326 are combined into a single filter 332 that outputs a signal 334 to the filter 216. Using a combined filter may ensure that the signal 334 is provided in a meaningful, combined reference frame. The global positioning navigation subsystem 335 differs from the global positioning navigation subsystem 322 in that it lacks the filter 326. Perception navigation subsystem 305 differs from the perception navigation subsystem 304 in that it lacks the filter 320.

Figure 4A:
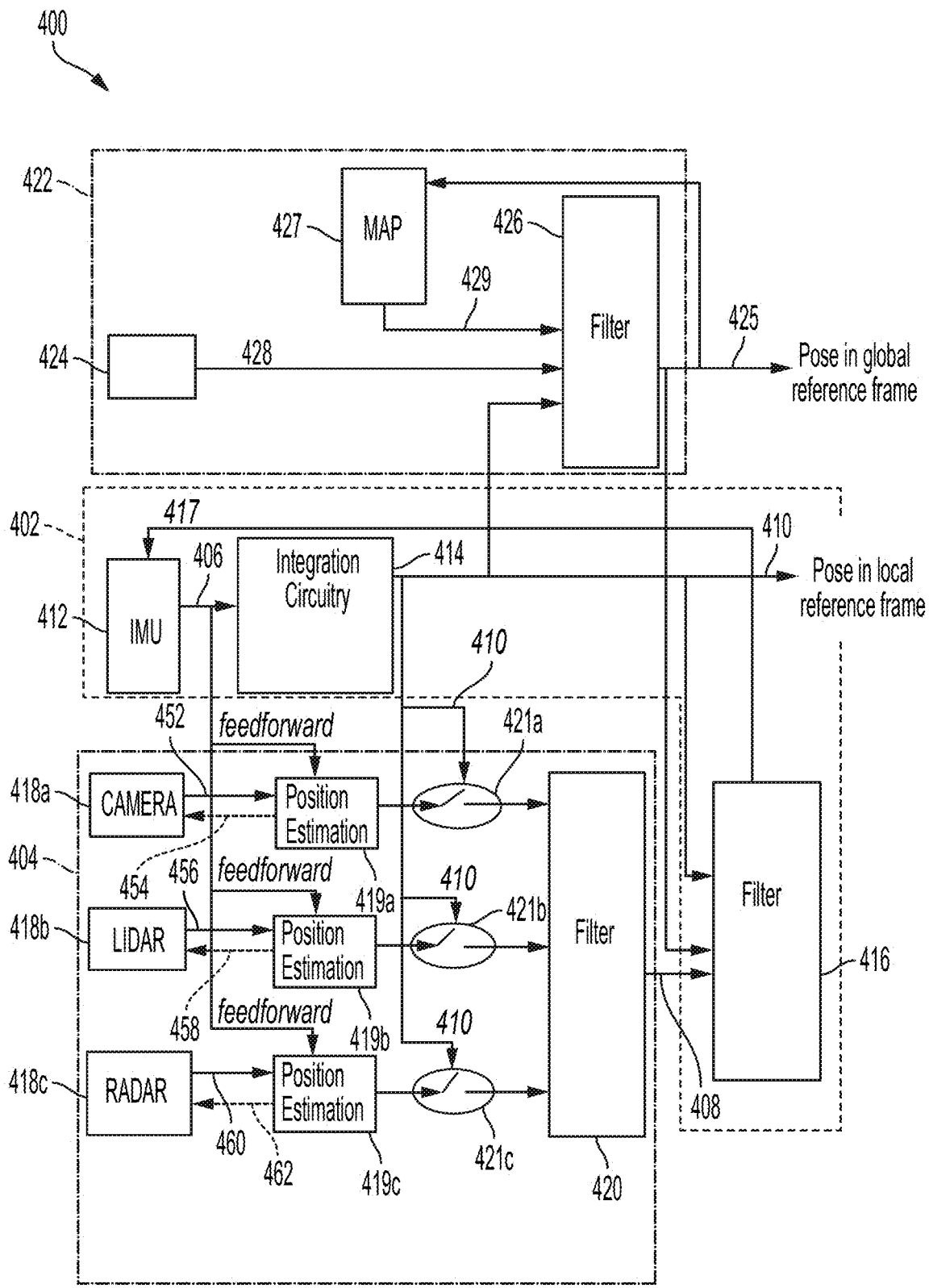
FIG. 4A is a non-limiting example of a further detailed implementation of the navigation system of FIG. 3A, comprising a global positioning navigation subsystem and perception navigation subsystem.

FIG. 4A is a non-limiting example of a detailed implementation of the navigation system of FIG. 3A, comprising a global positioning navigation subsystem and perception navigation subsystem. The navigation system 400 comprises a trusted motion unit 402 as one navigation subsystem, a perception navigation subsystem 404, and a global positioning navigation subsystem 422.

The trusted motion unit 402 comprises an IMU 412, integration circuitry 414, and filter 416. The IMU may be any suitable IMU, including any of the types described previously herein. The integration circuitry 414 may be any suitable integration circuitry for integrating the inertial data provided by the IMU, such as those types described previously herein. Filter 416 may operate as an integration filter with reference correction of the signals it receives. The filter 416 may be configured to output changes in angle and velocity, represented by $d\varphi$ and $dv$, respectively. The filter 416 is an extended Kalman filter in some embodiments. The filter 416 may provide a feedback signal 417 to the IMU 412 to provide bias and scale factor correction.

The perception navigation subsystem 404 comprises a camera 418a, lidar 418b, and radar 418c. The perception navigation subsystem may optionally include a wheel speed odometer, steering direction (or heading intent) sensor, and steering wheel rotation (or steering actuator input) sensor. The perception navigation subsystem 404 further comprises position estimation blocks 419a, 419b, and 419c coupled to the camera 418a, lidar 418b, and radar 418c, respectively. The position estimation blocks 419a-419c, which may be any suitable circuits, provide an estimate of the vehicle position in a local reference frame based on the respective sensor data from the respective sensor (camera 418a, lidar 418b, and radar 418c), before the data is fused with the data from the other perception sensors. The perception navigation subsystem 404 further comprises validation stages 421a, 421b, and 421c, and a filter 420. The filter 420 may be a local position integration filter, for example implemented as a Kalman filter, Bayesian filter, particle filter, or other suitable type of filter. The filter 420 is coupled to provide signal 408 to the filter 416.

The global positioning navigation subsystem 422 comprises a GPS sensor 424, filter 426, and a mapping block 427. The filter 426 may be configured to operate as a global position integration filter. The filter 426 may be a Kalman filter, Bayesian filter, particle filter, or other suitable type of filter. The global positioning navigation subsystem 422 may be configured to output a signal 425 representing the pose of the vehicle in a global reference frame. The pose information represented by signal 425 may have an accuracy between 10 cm and 1 m, and a latency between 0.1 seconds to 1 second in some embodiments. The signal 425 provided by the filter 426 may also be provided to the mapping block 427, which may process it and output mapping information 429 to the filter 426. Thus, the filter 426 and mapping block 427 may operate in a feedback loop.

In operation, the IMU 412 outputs localization information as signal 406. The signal 406 is provided to the integration circuitry 414 and is also provided as a feedforward signal to position estimation blocks 419a-419c, described further below. The integration circuitry 414 integrates the output signal 406 from the IMU 412 and produces output signal 410. The output signal 410 represents the pose of the vehicle in a local reference frame and may have accuracy between 1 cm and 10 cm with a latency between 1 ms to 10 ms in some embodiments. The output signal 410 is provided to the validation stages 421a-421c to facilitate sample validation, to the filter 416, and to the filter 426.

The camera 418a outputs a camera signal 452 to the position estimation block 419a and receives a feedback signal 454 from the position estimation block 419a. The lidar 418b outputs a lidar signal 456, which may be a point cloud, to the position estimate block 419*b* and receives a feedback signal 458 from the position estimate block 419*b*. The radar 418*c* outputs a radar signal 460 to the position estimation block 419*c* and receives a feedback signal 462 from the position estimation block 419*c*. Feedback signals 454, 458, and 462 may be used for making electronic or mechanical adjustments or accommodation for systemic changes of the types that may be best accommodated at the respective sensors. For example, systemic changes to attitude, heading, power, aperture, and sweep rates may be best accommodated at the sensors themselves. As one example, cameras may use mechanical drivers to reduce jitter, relying on position feedback.

The position estimation blocks 419*a*-419*c* produce signals representing position of the vehicle in a local frame. In addition to receiving the signals from the respective sensors, they receive the output signal 406 of the IMU 412 as a feedforward signal. The position estimation blocks process the output signal 406 in combination with the signal output from the respective sensor in developing the respective position signal output to the respective validation stages 421*a*, 421*b*, and 421*c*.

The validation stages 421*a*, 421*b*, and 421*c* are provided for the camera 418*a*, lidar 418*b*, and radar 418*c*, respectively. Validation stage 421*a* validates the pose estimation provided by the camera, by comparing the pose estimation as provided by the camera 418*a* to the pose estimation provided by the IMU 412 in the form of signal 410 output by the integration circuitry 414. If the errors in the pose estimation provided by the camera are outside a range of acceptability as compared to the pose estimation from the IMU, then the camera pose estimation may be determined to be invalid and not passed to the filter 420. However, if the pose estimation provided by the camera 418*a* is adjudged to be valid, then the pose estimation relating to the camera data may be provided to the filter 420. The sample validation stage 421*b* may act in the same manner with respect to the pose estimation from the lidar 418*b*. The sample validation stage 421*c* may act in the same manner with respect to the pose estimation provided by the radar 418*c*. The filter 420 receives valid pose estimations from the validation stages 421*a*-421*c* and outputs localization signal 408 to the filter 416.

The GPS sensor 424 produces a GPS signal 428 that is provided to the filter 426. The filter 426 also receives the signal 429 from the mapping block 427, and the output signal 410 from the integration circuitry 414. The filter 426 produces the signal 425 described previously.

Thus, the navigation system 400 may provide both a signal 410 representing the pose of the vehicle in a local reference frame and a signal 425 representing a pose of the vehicle in a global reference frame.

Variations on the configuration and operation of FIG. 4A are possible. For example, in some embodiments, integration circuitry 414 and filters 416 and 420, and position estimation blocks 419*a*-419*c* may operate in a local reference frame while filter 426 operates in a global reference frame, but in other embodiments integration circuitry 414 and filter 416 operate in a global reference frame. In some embodiments, signal 410 is provided in local coordinates, but in other embodiments is provided in global coordinates.

Figure 4B:
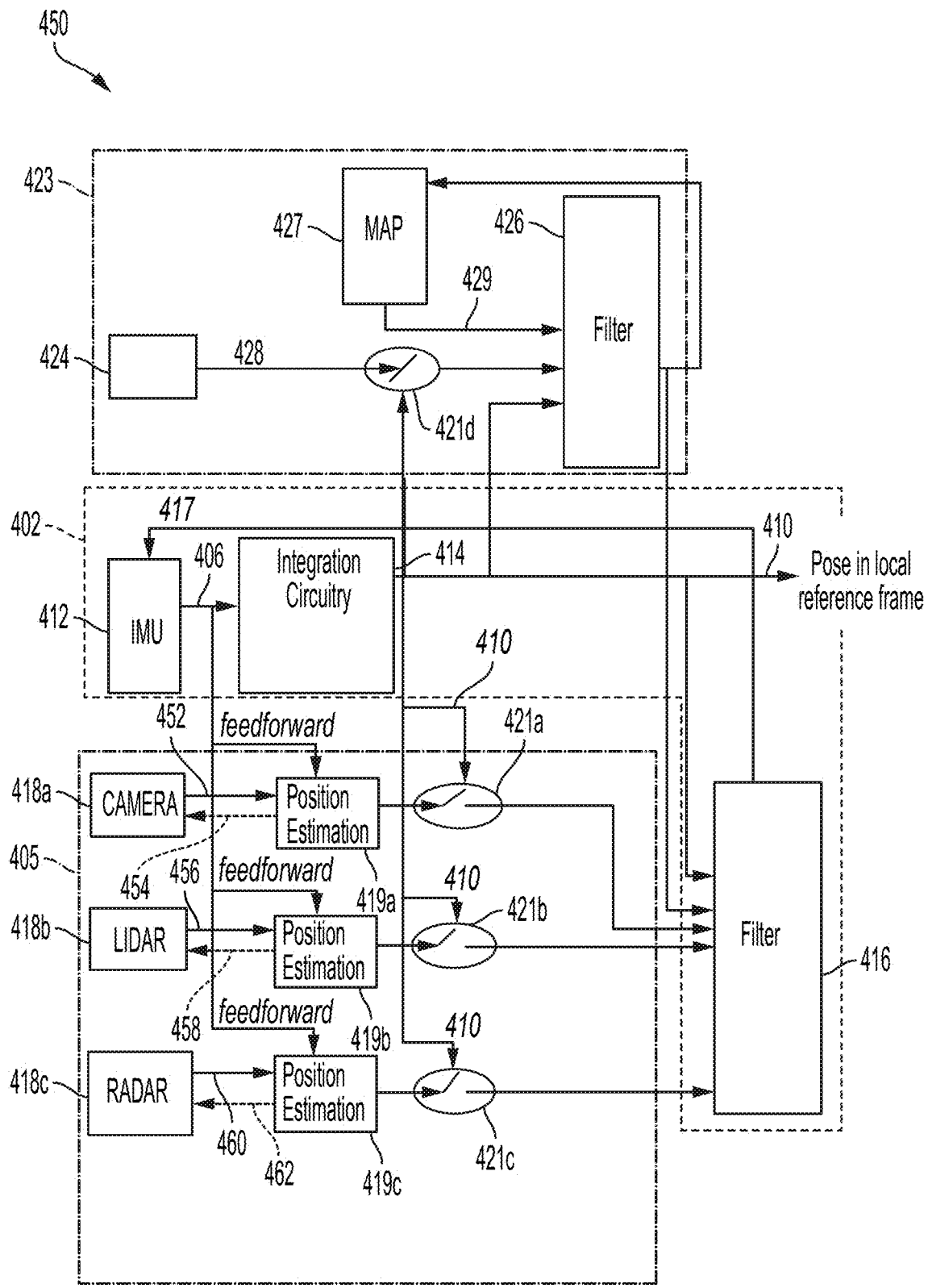
FIG. 4B is an alternative to FIG. 4A, illustrating another non-limiting example of a detailed implementation of the navigation system of FIG. 3A.

FIG. 4B is an alternative to FIG. 4A, illustrating another non-limiting example of a detailed implementation of the navigation system of FIG. 3A. The navigation system 450 of FIG. 4B differs from the navigation system 400 of FIG. 4A in that it includes a perception navigation subsystem 405 lacking the filter 420, and in that the filter 426 of the global positioning navigation subsystem 423 does not output signal 425. By omitting filter 420, the signals from validation stages 421*a*-421*c* may be provided directly to filter 416. Chaining filters 420 and 416, as done in FIG. 4A, may in some situations result in the errors input to filter 416 being correlated, which may have a negative impact on the operation of filter 416 depending on its type. Omitting filter 420 may avoid such a possibility. In addition, the navigation system 450 includes a validation stage 421*d* in the global positioning navigation subsystem 423. The validation stage 421*d* operates in the same manner previously described with respect to validation stages 421*a*-421*c* except that it operates on data from the GPS sensor 424. The navigation system 400 of FIG. 4A may optionally include the validation stage 421*d*.

In the embodiments of FIGS. 4A and 4B, the different sensors of the navigation subsystems may be given different weights. For example, in one embodiment, the IMU may be given the greatest weighting, followed by data from the camera 418*a*. the other sensors, including the GPS sensor 424, may be given less weight in computations of pose based on fusing the data from the different sensors. Thus, according to an aspect of the present application, a navigation system comprises a trusted motion unit as a first navigation subsystem wherein data from the IMU of the trusted motion unit is treated as the primary navigation data, and the navigation system further includes a camera providing visual data treated as the next most trustworthy source of data. Any additional sensors of the navigation system may produce data treated as less significant than the data of the trusted motion unit and the camera. Other configurations are possible, however.

Figure 5:
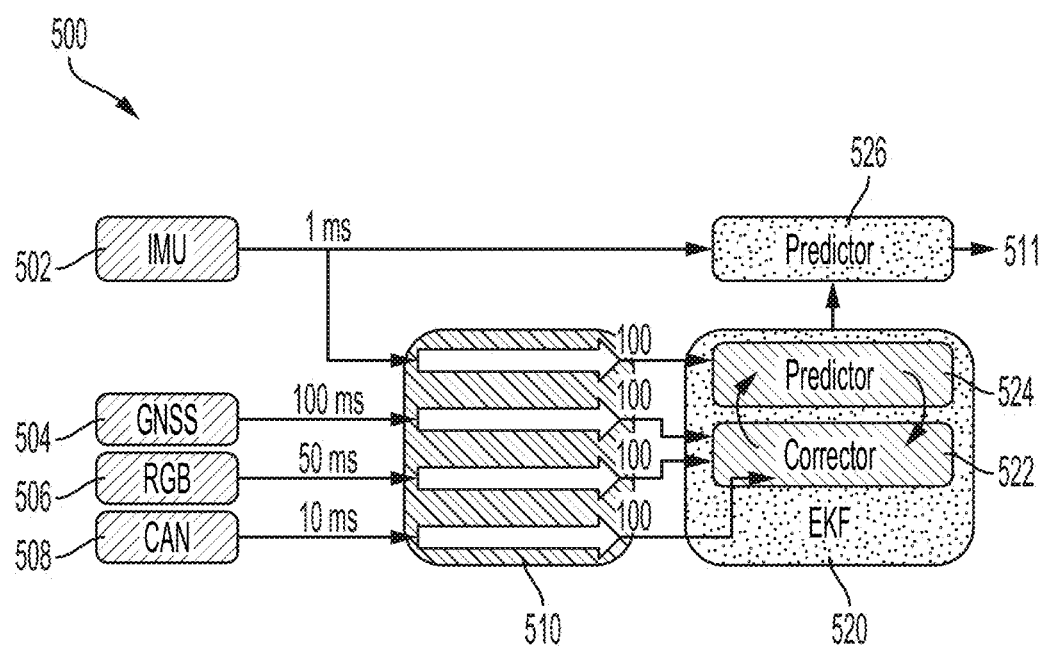
FIG. 5 illustrates a configuration of a navigation system comprising latency compensation to compensate for different latencies of different subsystems of the navigation system.

A feature of note in the configurations of FIGS. 4A and 4B is the relative timing of the signals processed by integration circuitry 414 and filter 416. As described previously herein, IMUs may exhibit lower latency than other types of sensors, such as perception sensors and GPS sensors. The filter 416 receives and operates on signals from the three navigation subsystems of FIGS. 4A and 4B, including the trusted motion unit 402, perception navigation subsystem 404, and global positioning navigation subsystem 422. Because those subsystems may operate with different latencies (the trusted motion unit operating with lower latency than the others), a latency compensation block may be included in the navigation systems of FIGS. 4A and 4B to compensate for the latency differences and ensure that filter 416 is operating on signals from the same time. For instance, delay may be added to the signals from the navigation subsystems with lower latency, so that the total latency is the same. The latency of the TMU, however, may remain controlled by the latency of the IMU, and thus may be lower than the latencies of the other subsystems even if the latencies within those subsystems are equalized. FIG. 5 illustrates a non-limiting example.

FIG. 5 illustrates a configuration of a navigation system 500 comprising latency compensation to compensate for different latencies of different subsystems of the navigation system. The navigation system 500 comprises an IMU 502, Global Navigation Satellite System (GNSS) sensor 504, imager 506 (for example, an RGB camera), and CAN sensor 508. For purposes of illustration, those components produce output signals having latencies of 1 ms, 100 ms, 50 ms, and 10 ms, respectively, although it should be appreciated that the listed latencies are non-limiting examples. The output signal from each of 502, 504, 506, and 508 is provided to a latency compensator 510 which applies suitable delays to one or more of the signals, and outputs corresponding signals of substantially equal latency. In this example, the GNSS sensor has the largest latency, of 100 ms, and therefore delays are applied by the latency compensator 510 to the signals from IMU 502, imager 506, and CAN sensor 508 so that they too exhibit a latency of 100 ms. The four signals are then provided to a filter 520, which may be an extended Kalman filter. Specifically, the signal from IMU 502 is provided to an integrator (also referred to herein as a "predictor") 524, and the signals from the GNSS sensor 504, imager 506, and CAN sensor 508 are provided to a corrector 522. The predictor 524 and corrector 522 exchange information to refine the data from the IMU 502 based on the data from the other sensors. The filter 520 outputs a signal to predictor 526, which also receives the IMU output signal from IMU 502, and outputs the pose of the vehicle as signal 511. The configuration of FIG. 5 therefore provides for the IMU data to serve as the primary data of the navigation system, to be corrected by data from the other sensors of the navigation system, while allowing the filters to operate on data of the same time. The latency of the IMU controls the latency of the output signal of the navigation system (e.g., signal 511 in FIG. 5), such that the latency of the output of predictor 526 is controlled by the latency of the IMU 502.

According to an aspect of the application, a method of localization for an autonomous vehicle having an first navigation subsystem including an inertial measurement unit and a first filter and a second navigation subsystem including a sensor and a second filter is provided. The method comprises applying an output signal of the IMU to the first filter, applying an output signal of the sensor to the second filter, and applying an output signal of the second filter to the first filter. In some embodiments, the method further comprises providing a feedback signal from the first filter to the IMU. In some embodiments, the method further comprises outputting from the first navigation subsystem an output signal indicative of a pose of the autonomous vehicle in a local reference frame. In some embodiments, the method further comprises outputting from the second navigation subsystem an output signal indicative of a pose of the autonomous vehicle in a global reference frame. In some embodiments, the autonomous vehicle further has a third navigation subsystem including a sensor and a third filter, and the method further comprises applying an output signal of the sensor of the third navigation subsystem to the third filter, and applying an output signal of the third filter to the first filter. The data from the first, second, and third navigation subsystems may be processed in combination by weighting data from the first navigation subsystem more heavily than data from the first and second navigation subsystems.

Figure 6:
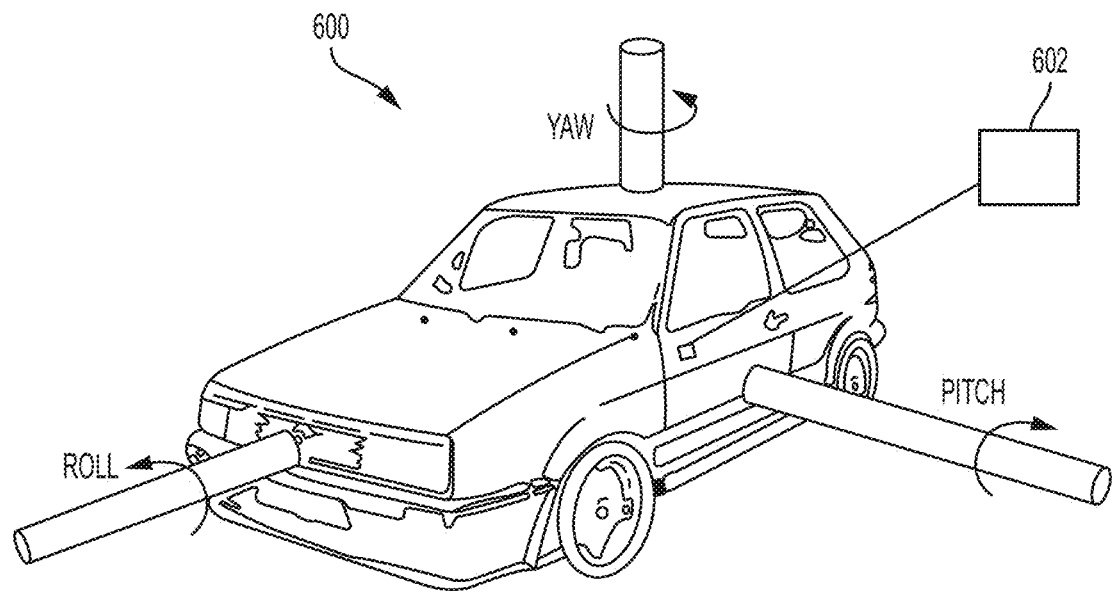
FIG. 6 illustrates a car as an example of an autonomous vehicle incorporating a navigation system of at type described herein.

FIG. 6 illustrates a car as an example of an autonomous vehicle incorporating a navigation system of at type described herein. The car 600 includes the navigation system 602. The navigation system 602 may be any of the types described previously herein. The navigation subsystem 602 comprises a trusted motion unit comprising an IMU. The navigation system 602 comprises one or more secondary navigation subsystems, such as a perception navigation subsystem and/or a global positioning navigation subsystem. The trusted motion unit may comprise a filter, and the navigation subsystem(s) may comprise a filter. The filter of the trusted motion unit may be configured to receive an input signal from the filter(s) of the secondary navigation subsystem.

Aspects of the present application may provide various benefits. Some non-limiting examples are now described. It should be appreciated that this list is not exhaustive, and that not all embodiments necessarily provide all listed benefits.

Aspects of the present application provide a navigation system for an autonomous vehicle exhibiting low latency. The latency of an IMU may be less, and in some embodiments significantly less, than that of perception systems and global positioning navigation systems. Thus, because aspects of the present application situate the IMU-based navigation subsystem as the primary navigation subsystem, the latency of the navigation system may be commensurate with the latency of the IMU, and thus lower than would result from the situation in which a perception system or global positioning navigation system was the primary navigation subsystem. For example, an IMU may operate on the order of 4 kHz, meaning that a navigation subsystem based on an IMU may provide latency on the order of 1 millisecond. At typical driving speeds, such as highway speeds, a latency on the order of 1 millisecond may translate into a driving distance of just a few centimeters. Thus, aspects of the present application provide navigation systems for autonomous vehicles which can provide accurate localization of the vehicle within a few centimeters, such as less than 10 cm. By contrast, utilizing a perception sensor-based navigation system having a latency on the order of tens of Hertz may lead to localization accuracy only within several meters, which is too great to provide safe operation of a vehicle. Moreover, IMU sensors may provide a sufficiently accurate output for approximately ten seconds or more without correction. That time is sufficient to obtain data from a perception or global positioning systems sensor, that may then be used to correct errors in the IMU signal. Accordingly, structuring the IMU-based navigation subsystem as the primary navigation subsystem may optimize the interplay between the IMU-based navigation subsystem and other types of navigation subsystems.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A navigation system, comprising:
    a first navigation subsystem comprising an inertial measurement unit (IMU), the first navigation subsystem configured to provide a first signal; and
    a second navigation subsystem configured to provide a second signal,
    wherein the navigation system is configured to provide a pose signal based on the first signal of the first navigation subsystem and the second signal of the second navigation subsystem, the pose signal having a lower latency than the second signal of the second navigation subsystem.

2. The navigation system of claim 1, wherein:
    the first signal of the first navigation subsystem has a lower latency than the second signal of the second navigation subsystem.

3. The navigation system of claim 1, wherein:
    the first navigation subsystem further comprises an integration circuit configured to receive a signal from the IMU.

4. The navigation system of claim 1, further comprising:
    a feedback loop configured to provide a signal to the first navigation subsystem based on the second signal of the second navigation subsystem.

5. The navigation system of claim 1, wherein:
    the second navigation subsystem comprises a perception sensor; and the second navigation subsystem configured to provide the second signal based on a signal from the perception sensor.

6. The navigation system of claim 1, wherein:
the second navigation subsystem comprises a global positioning sensor; and
the second navigation subsystem configured to provide the second signal based on a signal from the global positioning sensor.

7. The navigation system of claim 1, further comprising a first filter configured to:
receive the first signal of the first navigation subsystem and the second signal of the second navigation subsystem;
adjust the first signal of the first navigation subsystem using the second signal of the second navigation subsystem; and
provide the pose signal based on the adjusted signal.

8. A method of navigation via a navigation system of a vehicle, the method comprising:
receiving, at the navigation system, a first signal based on a signal of an inertial measurement unit (IMU);
receiving a second signal based on a signal of a secondary sensor of the vehicle; and
determining a pose signal using the first signal based on the IMU and the second signal based on the secondary sensor, the pose signal having a lower latency than the second signal based on the secondary sensor, wherein the pose signal corresponds to a pose of the vehicle.

9. The method of claim 8, wherein:
the first signal based on the signal of the IMU has a lower latency than the second signal based on the signal of the secondary sensor.

10. The method of claim 8, wherein:
a first navigation subsystem comprises the IMU and an integration circuit; and
receiving the first signal based on the signal of the IMU comprises using the integration circuit to determine the first signal based on the signal from the IMU.

11. The method of claim 10, further comprising:
providing a feedback signal to the first navigation subsystem based on the second signal of the second navigation subsystem.

12. The method of claim 8, wherein the secondary sensor comprises a perception sensor, and the method further comprises:
determining the second signal based on a signal from the perception sensor.

13. The method of claim 8, wherein the secondary sensor comprises a global positioning sensor, and the method further comprises:
determining the second signal based on a signal from the global positioning sensor.

14. The method of claim 8, wherein determining the pose signal comprises:
receiving the first signal based on the signal from the IMU and the second signal based on the signal from the secondary sensor;
adjusting the first signal based on the signal from the IMU using the second signal based on the signal from the secondary sensor; and
providing the pose signal based on the adjusted signal.

15. An apparatus for determining pose, comprising:
a first navigation subsystem comprising an inertial measurement unit (IMU), the first navigation subsystem configured to provide a first signal;
a second navigation subsystem configured to provide a second signal; and
means for providing an output pose signal having a lower latency than the second signal of the second navigation subsystem.

16. The apparatus of claim 15, wherein:
the first signal of the first navigation subsystem has a lower latency than the second signal of the second navigation subsystem.

17. The apparatus of claim 15, wherein:
the first navigation subsystem further comprises an integration circuit configured to receive a signal from the IMU.

18. The apparatus of claim 15, further comprising:
a feedback loop configured to provide a signal to the first navigation subsystem based on the second signal of the second navigation subsystem.

19. The apparatus of claim 15, wherein:
the second navigation subsystem comprises a perception sensor; and
the second navigation subsystem configured to provide the second signal based on a signal from the perception sensor.

20. The apparatus of claim 15, wherein:
the second navigation subsystem comprises a global positioning sensor; and
the second navigation subsystem configured to provide the second signal based on a signal from the global positioning sensor.

* * * * *